United States Patent

Lippert et al.

Patent Number: 5,986,027
Date of Patent: Nov. 16, 1999

[54] OLEFIN POLYMERIZATION USING A CATALYST COMPRISING A GROUP VIIIB METAL, AND ACID, AND A BIDENTATE CHELATING COMPOUND

[75] Inventors: Ferdinand Lippert, Bad Dürkheim; Arthur Höhn, Kirchheim; Eckard Schauss, Heuchelheim, all of Germany

[73] Assignee: BASF Aktiengesellschaft, Ludwigshafen, Germany

[21] Appl. No.: 08/952,210

[22] PCT Filed: May 9, 1996

[86] PCT No.: PCT/EP96/01973

§ 371 Date: Nov. 6, 1997

§ 102(e) Date: Nov. 6, 1997

[87] PCT Pub. No.: WO96/37523

PCT Pub. Date: Nov. 28, 1996

[30] Foreign Application Priority Data

May 22, 1995 [DE] Germany ............... 195 18 738

[51] Int. Cl.⁶ .................................................... C08F 4/06
[52] U.S. Cl. ................ 526/126; 526/135; 526/145; 526/147; 526/172; 502/155
[58] Field of Search ................ 526/348, 135, 526/145, 147, 170, 171, 172, 194, 126, 93; 502/213, 155

[56] References Cited

U.S. PATENT DOCUMENTS 5,216,120 6/1993 Drent et al. .................. 528/392

FOREIGN PATENT DOCUMENTS

| 317 003 | 5/1989 | European Pat. Off. . |
| 454 231 | 10/1991 | European Pat. Off. . |
| 501 576 | 9/1992 | European Pat. Off. . |
| 516 238 | 12/1992 | European Pat. Off. . |
| 569 032 | 11/1993 | European Pat. Off. . |
| 589 527 | 3/1994 | European Pat. Off. . |
| 589527A1 | 3/1994 | European Pat. Off. . |
| 2 274 252 | 7/1994 | United Kingdom . |

*Primary Examiner*—David W. Wu
*Assistant Examiner*—Roberto Rabago
*Attorney, Agent, or Firm*—Keil & Weinkauf

[57] ABSTRACT

Polymers are obtainable by polymerizing olefinically unsaturated monomers in the presence of a catalyst system which comprises as active constituents a) a salt of a metal of group VIII B of the Periodic Table of the Elements, b) one or more compounds selected from the group consisting of protic acids and Lewis acids, c) a chelating compound of the formula (I)

$$R^1R^2E^1\text{—}Z\text{—}E^2R^3R^4 \qquad (I)$$

where the substituents and indices have the following meanings:

$E^1$, $E^2$ are each an element from group VA of the Periodic Table of the Elements, Z is a bridging structural unit comprising one, two or three substructural units of elements of groups IVA, VA and VIA of the Periodic Table of the Elements, $R^1$ to $R^4$ are substituents selected from the group consisting of $C_1$–$C_{20}$-organic and $C_3$–$C_{30}$-organosilicon radicals, where the radicals may contain one or more elements of groups IVA, VA, VIA and VIIA of the Periodic Table of the Elements.

6 Claims, No Drawings

OLEFIN POLYMERIZATION USING A CATALYST COMPRISING A GROUP VIIIB METAL, AND ACID, AND A BIDENTATE CHELATING COMPOUND

The present invention relates to polymers obtainable by polymerization of olefinically unsaturated monomers in the presence of a catalyst system which comprises as active constituents a) a salt of a metal of group VIII B of the Periodic Table of the Elements, b) one or more compounds selected from the group consisting of protic acids and Lewis acids, c) a chelating compound of the formula (I)

$$R^1R^2E^1\text{—}Z\text{—}E^2R^3R^4 \qquad (I)$$

where the substituents and indices have the following meanings:

$E^1$, $E^2$ are each an element from group VA of the Periodic Table of the Elements, z is a bridging structural unit comprising one, two or three substructural units of elements of groups IVA, VA and VIA of the Periodic Table of the Elements, $R^1$ to $R^4$ are substituents selected from the group consisting of $C_1$–$C_{20}$-organic and $C_3$–$C_{30}$-organosilicon radicals, where the radicals may contain one or more elements of groups IVA, VA, VIA and VIIA of the Periodic Table of the Elements.

In addition, the invention relates to a process for preparing these polymers, to films, fibers and moldings produced from these polymers and to the use of the polymers of the present invention as films, fibers and moldings.

The polymerization of olefinic monomers, for example ethylene, $C_3$–$C_8$-alk-1-enes and acrylic acid derivatives is well known for different polymerization processes, and the polyolefins which can be obtained are widely used commercially in many application areas, for example as film, moldings and fibers.

The polymerization of the olefins is catalyzed or initiated, inter alia, by means of mixed catalysts comprising compounds of the early transition metals (titanium, zirconium, etc) and alkyl compounds of the main group metals (eg. aluminum alkyls), known as Ziegler catalysts, or else by means of free-radical initiators.

However, Ziegler catalysts have a number of disadvantages. They generally react, sometimes very vigorously, with moisture and oxygen, which generally results in loss of their catalytic activity.

Furthermore, these catalysts are generally not able to (co)polymerize unsaturated compounds which contain functional groups such as carboxyl groups or ester groups.

In addition, the polymerization of cyclic, olefinically unsaturated monomers or of multiply olefinically unsaturated, linear monomers often does not proceed in the desired way, namely as a polyinsertion reaction, but secondary reactions such as ring opening of the cyclic monomers or ring formation from the linear monomers occur. The resulting polymers have a relatively high nonuniformity of the chemical composition and also of the molecular weight distribution.

Free-radical initiators are, generally under high pressure, able to copolymerize, for example, olefins with polar, unsaturated monomers, but the incorporation of the comonomers is often nonuniform and the polymer chains generally have nonuniform branching, which leads, for example, to a low polymer film quality.

These characteristics restrict the range of applications of the resulting polymers which are obtained by the various known polymerization processes and it is therefore desirable to seek alternative polymers which do not have the disadvantages mentioned or have them only to a subordinate degree.

EP-A 0 589 527 describes catalyst systems based on specific palladium-phosphine complexes for homopolymerization and copolymerization of olefins. However, both the preparative accessibility and also the polymerization behavior of these catalysts leave something to be desired. Thus, only low degrees of polymerization (oligomers having from 3 to 20 monomer units) are obtained in polar solvents such as methanol, ethylene glycol or water. In nonpolar solvents such as diethylene glycol dimethyl ether (diglyme), maximum molar masses $M_n$ of 5600 are achieved, but only traces of the comonomer are then incorporated. Furthermore, the use of internal olefins is not described and the double bond content of the polymers and their molecular weight distribution $M_w/M_n$ is likewise not disclosed.

EP-A 0 454 231 describes catalyst systems based on cationic metal complexes of late transition metals (group VIII) for the polymerization of ethylene, olefins and alkynes. However, these catalysts are very sensitive to impurities. Likewise, the is achievable productivities leave something to be desired. No polar copolymers are described.

It is an object of the present invention to provide novel polymers which do not have the disadvantages indicated and which, in particular, comprise polar comonomers incorporated in a linear sequence.

We have found that this object is achieved by polymers obtainable by polymerization of olefinically unsaturated monomers in the presence of a catalyst system which comprises as active constituents a) a salt of a metal of group VIII B of the Periodic Table of the Elements, b) one or more compounds selected from the group consisting of protic acids and Lewis acids, c) a chelating compound of the formula (I)

$$R^1R^2E^1\text{—}Z\text{—}E^2R^3R^4 \qquad (I)$$

where the substituents and indices have the following meanings:

$E^1$, $E^2$ are each an element from group VA of the Periodic Table of the Elements, z is a bridging structural unit comprising one, two or three substructural units of elements of groups IVA, VA and VIA of the Periodic Table of the Elements, $R^1$ to $R^4$ are substituents selected from the group consisting of $C_1$–$C_{20}$-organic and $C_3$–$C_{30}$-organosilicon radicals, where the radicals may contain one or more elements of groups IVA, VA, VIA and VIIA of the Periodic Table of the Elements.

In addition, we have found a process for preparing the polymers, 15 their use for producing films, fibers and moldings, and also the films, fibers and moldings.

Suitable metals for component (a) of the catalyst system of the present invention are the metals of group VIII B of the Periodic Table of the Elements, ie. iron, cobalt and nickel and especially the platinum metals ruthenium, rhodium, osmium, iridium, platinum and particularly preferably palladium.

These metals are preferably used in the form of their salts. Suitable salts are halides, sulfates, phosphates, nitrates and carboxylates such as acetates, propionates, oxalates, citrates and benzoates, and also sulfonic acid salts such as methylsulfonates, trifluoromethylsulfonates and para-toluenesulfonates. Preference is given to using carboxylates, sulfonic acid derivatives and in particular acetates.

Particularly suitable catalyst components (a) are palladium carboxylates, preferably palladium acetate, palladium propionate, palladium trifluoroacetate and palladium oxalate, and also palladium sulfonates, preferably palladium trifluoromethanesulfonate, palladium methanesulfonate and palladium p-toluenesulfonate; particular preference is given to using palladium acetate.

Catalyst constituents (b) used are Lewis and protic acids and their mixtures.

Suitable protic acids (b) are strong mineral acids, preferably having a $pK_a$ of less than 3, for example sulfuric acid and perchloric acid, and also strong organic acids such as trichloroacetic and trifluoroacetic acids, and also the sulfonic acids methanesulfonic acid, p-toluenesulfonic acid and benzenesulfonic acid.

Further suitable protic acids are the acidic salts of strong acids and weak bases, for example ammonium salts of the abovementioned acids.

Examples of suitable Lewis acids are halides of the elements of group IIIA of the Periodic Table of the Elements, for example boron trifluoride, boron trichloride, aluminum trifluoride and aluminum trichloride, halides of the elements of group VA of the Periodic Table of the Elements, for example phosphorus pentafluoride and antimony pentafluoride, and also halides of the metals of transition group IVB of the Periodic Table of the Elements, for example titanium tetrachloride and zirconium tetrachloride. Further suitable Lewis acids are organically substituted Lewis acids such as tris(pentafluorophenyl)borane.

As Lewis acids, preference is given to using boron trifluoride, antimony pentafluoride or tris(pentafluorophenyl)borane.

Particularly preferred components (b) are those which have a weakly coordinating conjugated anion, ie. an anion which forms only a weak bond to the central metal of the complex, for example $BF_4—$, $PF_6—$, $ClO_4—$, $CF_3CO_2—$, $CF_3SO_3—$, p-tosylate and borates such as catecholatoborate.

Other suitable catalyst components (a) and (b) are those which are generally known for systems comprising bisphosphines from EP-A 501 576 and 516 238.

As component (c), the catalyst systems comprise a chelating compound of the formula (I).

Elements which are suitable as $E^1$ and $E^2$ are the elements of main group V of the Periodic Table of the Elements (group VA), ie. nitrogen, phosphorus, arsenic, antimony and bismuth. Particularly suitable elements are nitrogen and phosphorus, in particular phosphorus. The chelating compound can contain different elements $E^1$ and $E^2$, for example nitrogen and phosphorus.

The bridging structural unit Z is a group of atoms which connects the two elements $E^1$ and $E^2$ to one another. One atom or else two or three atoms from group IVA, VA or VIA of the Periodic Table of the Elements form the connecting bridge between $E^1$ and $E^2$. Any free valences of these bridge atoms can be satisfied in many ways, for example by bonding to hydrogen or elements from groups IVA, VA, VIA and VIIA of the Periodic Table of the Elements. These substituents can also form a ring with one another or with the bridge atom.

Well suited bridging structural units are those comprising one, two or three elements from group IVA of the Periodic Table of the Elements, for example methylene ($—CH_2—$), 1,2-ethylene ($—CH_2—CH_2—$), 1,3-propylene ($—CH_2—CH_2—CH_2—$), 1,3-disilapropylene ($—R^5R^6Si—CH_2—SiR^5R^6—$), ethylidene ($CH_3(H)C=$), 2-propylidene ($(CH_3)_2C=$), diphenylmethylene ($(C_6H_5)_2C=$) or ortho-phenylene.

Particularly suitable bridging structural units are those having only one bridging atom, for example $—CR^5R^6—$ or $—SiR^5R^6—$, where $R^5$ and $R^6$ are each hydrogen or a $C_1–C_{10}$-organic radical. $R^5$ and $R^6$ together with the bridge atom can also form a 3- to 10-membered ring. Examples of bridging structural units having a single bridging atom are methylene ($—CH_2—$), ethylidene ($CH_3(H)C=$), 2-propylidene ($(CH_3)_2C=$), diphenylmethylene ($(C_6H_5)_2C=$), dialkylsilylene such as dimethylsilylene and diphenylsilylene; furthermore as cyclic bridging units cyclopropylidene, cyclobutylidene, cyclopentylidene and cyclohexylidene. Preferred bridging structural units are methylene ($—CH_2—$), ethylidene ($CH_3(H)C=$), 2-propylidene ($(CH_3)_2C=$), dimethylsilylene and diphenylsilylene, in particular methylene.

Suitable organic radicals $R^1$ to $R^4$ are aliphatic, cycloaliphatic and aromatic radicals having from 1 to 20 carbon atoms, for example methyl, ethyl, 1-propyl, 1-butyl, 1-pentyl, 1-hexyl and 1-octyl. Also suitable are linear arylalkyl groups having from 1 to 10 carbon atoms in the alkyl radical and from 6 to 20 carbon atoms in the aryl radical, for example benzyl, and also aryl radicals such as phenyl, tolyl and other substituted phenyl groups.

The radicals $R^1$ to $R^4$ should preferably be sufficiently bulky so as to substantially screen the central atom, eg. the palladium atom, with which the atoms $E^1$ and $E^2$ form the active complex. Radicals which meet this requirement are, for example, cycloaliphatic radicals and also branched aliphatic radicals, particularly those which are branched in the α position.

Suitable cycloaliphatic radicals are the cyclopentyl, cyclohexyl and menthyl groups and also, in particular, bicyclic radicals such as the norbornyl, pinanyl, bornyl and bicyclononyl groups, where the ring framework may be linked in any way to the atoms $E^1$ and $E^2$. The cycloaliphatic radicals preferably contain a total of from 5 to 20 carbon atoms.

Suitable branched aliphatic radicals are $C_3–C_{20}—$, preferably $C_3–C_{12}$-alkyl radicals such as isopropyl, isobutyl, sec-butyl, neopentyl and tert-butyl, also alkylaryl having from 1 to 10 carbon atoms in the alkyl radical and from 6 to 20 carbon atoms in the aryl radical.

Particularly suitable radicals are tert-butyl, isopropyl, sec-butyl and menthyl.

Alkyl groups which are branched further out are also well suitable as substituents $R^1$ to $R^4$; examples are isobutyl, 3-methylbut-2-yl and 4-methylpentyl.

On the basis of observations to the present time, the chemical nature of the radicals $R^1$ to $R^4$ is not of decisive importance, ie. the radicals can also contain atoms from groups IVA, VA, VIA and VIIA of the Periodic Table of the Elements, for example halogen, oxygen, sulfur, nitrogen and silicon, for example the bis(trimethylsilyl)methyl group. Functional groups such as hydroxy, alkoxy and cyano which are inert under the polymerization conditions are also possibilities in this context.

Preferred heterosubstituents $R^1$ to $R^4$ are $C_3–C_{30}$-organosilicon radicals, ie. tetravalent silicon atoms which are bound to $E^1$ or $E^2$ and whose other valences are occupied by three organic radicals, where the number of carbon atoms in all radicals which are bound directly or indirectly to silicon is in the range from three to thirty. Examples which may be mentioned are the trimethylsilyl, tert-butyldimethylsilyl and triphenylsilyl groups, in particular the trimethylsilyl group.

As component (c), preference is given to diphosphines bridged by a methylene group, particularly preferably methylene-bridged diphosphines substituted by $C_3$–$C_{10}$-cycloaliphatic or branched $C_3$–$C_{20}$-aliphatic radicals $R^1$ to $R^4$, for example bis(di-tert-butylphosphino)methane, [(di-tert-butylphosphino)(di-cyclohexylphosphino] methane or bis(dicyclohexylphosphino)methane whose good suitability for the process of the present invention is at present attributed to the methylene linkage of the two phosphorus atoms and the three-dimensional structure of the radicals $R^1$ to $R^4$.

A very particularly preferred compound as component (c) is bis,(di-tert-butylphosphino)methane.

The ratio of the catalyst constituents (a), (b) and (c) to one another is generally selected such that the molar ratio of the metal compound (a) to the acid (b) is from 0.01:1 to 100:1, preferably from 0.1:1 to 1:1, and the molar ratio of the metal compound (a) to the chelating ligand (c) is from 0.01:1 to 10:1, preferably from 0.1:1 to 2:1.

According to the present invention, the catalyst system is used for preparing polymers of olefinically unsaturated monomers.

Suitable olefinically unsaturated compounds are in principle all monomers of this class of compounds.

Suitable monomers are particularly ethylene and $C_3$–$C_{10}$-alk-1-enes such as propylene, 1-butene, 1-pentene, 1-hexene, 1-heptene, 1-octene, 1-nonene and 1-decene. Internal trans- or cis-olefins such as 2-butene, 2-pentene, 2- and 3-hexene can also be advantageously used; further suitable monomers are dienes such as 1,3-butadiene, 1,4-hexadiene and 1,5-hexadiene and also cycloolefins such as cyclopentene, cyclohexene, norbornene and norbornadiene, cyclopentadiene and dicyclopentadiene.

Olefinically unsaturated aromatic monomers are first and foremost styrene and α-methylstyrene.

Furthermore, olefins substituted by functional groups are of particular importance as monomers. Possible functional groups are the carboxyl group, —COOH, and its derivatives, for example esters, halides and amides, also the hydroxyl group, the cyano group, —CN, the keto group, the aldehyde group and the carboxylate group and also the silyl group, —$SiR_3$, where R is hydrogen or a $C_1$–$C_{15}$- organic radical.

Particularly suitable olefins substituted by functional groups are acrylic acid and methacrylic acid as well as their derivatives, among these especially the nitriles, the amides and the $C_1$–$C_{10}$-alkyl esters, for example acrylonitrile, methacrylonitrile, methyl acrylate, ethyl acrylate, propyl acrylate, butyl acrylate, tert-butyl acrylate, 2-ethylhexyl acrylate, methyl methacrylate, ethyl methacrylate and propyl methacrylate. Further suitable monomers are vinyl chloride, vinyl acetate, vinyl propionate, maleic anhydride and N-vinylpyrrolidone.

Of course, it is also possible to use mixtures of various monomers.

The molar ratio of the different monomers can largely be selected freely.

The polymerization conditions are not critical per se. The polymerizations can be carried out either batchwise or continuously.

Pressures of from 100 to 500,000 kPa, preferably from 200 to 350,000 kPa and in particular from 500 to 30,000 kPa, and temperatures of from −50 to 400° C., preferably from 20 to 250° C. and in particular from 40 to 150° C., have been found to be useful.

Polymerization reactions using the catalyst systems of the present invention can be carried out in the gas phase, in suspension, in liquid and in supercritical monomers and in solvents which are inert under the polymerization conditions.

Suitable inert solvents are alcohols such as methanol, ethanol, propanol, i-propanol, 1-butanol and tert-butanol, sulfoxides and sulfones, for example dimethyl sulfoxide, esters such as ethyl acetate and butyrolactone, ethers such as tetrahydrofuran, dimethyl(ethylene glycol) and diisopropyl ether and also aromatic solvents such as benzene, toluene, ethylbenzene or chlorobenzene or mixtures of these.

The molecular weight of the polymers of the present invention can be regulated in a customary manner by varying the polymerization temperature and by the addition of hydrogen.

The process of the present invention enables high molecular weight polymers ($M_w$ for example greater than 1000) to be obtained even in polar, protic solvents such as methanol. This is particularly advantageous in the case of the copolymers comprising polar or nonpolar comonomers.

The polymers prepared using the process of the present invention generally have a high molecular weight, a narrow molecular weight distribution and a high proportion of double bonds.

The polymers are suitable for producing moldings, in particular moldings for packaging and also for producing films, fibers and adhesion promoters, and can easily be chemically modified owing to their reactive double bonds.

EXAMPLES

A 0.3 l autoclave was charged with methanol, palladium acetate, bis(di-tert-butylphosphino)methane and p-toluenesulfonic acid and, where applicable, the comonomer. Ethylene was then injected at the desired temperature to the desired total pressure (see Table 1) and polymerization was carried out for 5 hours. The reaction temperature and the pressure were kept constant during the entire reaction time, after which the polymerization was stopped by cooling and venting the autoclave, the reaction mixture was filtered and the polymer was isolated.

The process parameters, amounts of solvents and catalysts used and also the amounts of polymer obtained are shown in Table 1 and the polymer properties and analytical data are shown in Table 2.

The polymers prepared using the process of the present invention were characterized by GPC, FT-IR and $^{13}$C-NMR analysis. The molecular weights $M_w$ and $M_n$ and their distribution $M_w/M_n$ were determined by means of gel permeation chromatography (GPC) in 1,2,4-trichlorobenzene at 135° C. (polyethylene standard). The $^{13}$C-NMR analyses were carried out at 120° C. in $C_2D_2Cl_4$ as solvent. The melting points were measured using the DSC method.

Abbreviations:

Pdac=Palladium acetate, Pd(OAc)$_2$ dtbpm=Bis(di-tert-butylphosphino)methane p-TSA=p-Toluenesulfonic acid MA=Methyl acrylate Raff. II=Raffinate II=45% by volume of 1-butene, 35% by volume of 2-butenes, 20% by volume of butanes

TABLE 1

Process parameters

| Ex. | Catalyst/(mmol) | Pressure [kPa] | Temp. [° C.] | Comonomer/ [g] | Yield [g] |
|---|---|---|---|---|---|
| 1 | Pdac/0.1 dtbpm/0.26 p-TSA/1.0 | 6000 | 85 | — | 2.0 |
| 2 | Pdac/0.2 dtbpm/0.8 p-TSA/0.7 | 6000 | 85 | — | 3.0 |
| 3 | Pdac/0.1 dtbpm/0.26 p-TSA/1.0 | 20,000 | 85 | — | 2.9 |
| 4 | Pdac/0.1 dtbpm/0.26 p-TSA/1.0 | 20,000 | 85 | — | 3.3 |
| 5 | Pdac/0.1 dtbpm/0.26 p-TSA/1.0 | 6000 | 85 | MA/10.0 | 2.3 |
| 6 | Pdac/0.2 dtbpm/0.52 p-TSA/2.0 | 6000 | 85 | MA/10.0 | 5.2 |
| 7 | Pdac/0.1 dtbpm/0.26 p-TSA/1.0 | 6000 | 85 | Raff.II/30 ml | 1.5 |
| 8 | Pdac/0.1 dtbpm/0.26 p-TSA/1.0 | 6000 | 100 | 2-hexene/5.0 | 1.8 |

TABLE 2

Properties of the polymers

| Ex. | Mp. [° C.] | $M_w$ | $M_w/M_n$ | Total number of C=C double bonds [1/1000 C] |
|---|---|---|---|---|
| 1 | 113 | 3201 | 1.85 | 7.35 |
| 2 | 108 | 2238 | 1.89 | — |
| 3 | 119 | 3457 | 1.83 | 6.88 |
| 4 | 118 | 3637 | 1.81 | 6.64 |
| 5 | 106 | 2800 | 1.80 | 9.00 |
| 6 | 107 | 6200 | 2.50 | 8.00 |
| 8 | 90 | 1430 | 2.40 | 10.78 |

We claim:

1. A process for preparing polymers of only olefinically unsaturated monomers by polymerization of unsaturated monomers in the presence of a catalyst system which contains no trialkylaluminum and comprises as active constituents a) a salt of a metal of group VIII B of the Periodic Table of the Elements, b) one or more compounds selected from the group consisting of protic acids and Lewis acids, c) a chelating compound of the formula (I)

$$R^1R^2E^1—Z—E^2R^3R^4 \qquad (I)$$

where the substituents and indices have the following meanings:

$E^1$ and $E^2$ are each an element from group VA of the Periodic Table of the Elements, Z is a bridging structural unit comprising one, two or three substructural units of elements of groups IVA, VA and VIA of the Periodic Table of the Elements, $R^1$ to $R^4$ are substituents selected from the group consisting of $C_1$–$C_{20}$-organic and $C_3$–$C30$-organosilicon radicals, where the radicals may contain one or more elements of groups IVA, VA, VIA and VIIA of the Periodic Table of the Elements and may be substituted with functional groups which are inert under Polymerization conditions.

2. A process as claimed in claim 1, wherein the olefinically unsaturated compounds used are olefins, diolefins or olefins substituted by functional groups, or vinylaromatics.

3. A process according to claim 1, wherein Z is a bridging structural unit comprising one, two or three bridge atoms from group IVA of the Periodic Table of the Elements.

4. A process according to claim 1, wherein Z is —$CR^5R^6$— or —$SiR^5R^6$— and $R^5$ and $R^6$ are each hydrogen or a $C_1$–$C_{10}$-organic radical.

5. A process according to claim 1, wherein $E^1$ and $E^2$ are phosphorus.

6. A process according to claim 1, wherein $R^1$ to $R^4$ are each a $C_1$–$C_{20}$-aliphatic or $C_3$–$C_{20}$-cycloaliphatic radical.

* * * * *

UNITED STATES PATENT AND TRADEMARK OFFICE
CERTIFICATE OF CORRECTION

PATENT NO.: 5,986,027

DATED: November 16, 1999

INVENTOR(S): LIPPERT et al.

It is certified that error appears in the above-identified patent and that said Letters Patent is hereby corrected as shown below:

Col. 8, claim 1, line 22, "C30" should be --$C_{30}$--.

Col. 8, claim 1, line 26, "Polymer-" should be --polymer- --.

Signed and Sealed this

Ninth Day of May, 2000

*Attest:*

Q. TODD DICKINSON

*Attesting Officer*     *Director of Patents and Trademarks*